(12) United States Patent
Buccafusca et al.

(10) Patent No.: US 9,379,927 B2
(45) Date of Patent: Jun. 28, 2016

(54) METHOD AND APPARATUS TO TRANSMIT, RECEIVE AND PROCESS SIGNALS WITH NARROW BANDWITH DEVICES

(75) Inventors: Osvaldo Buccafusca, Fort Collins, CO (US); Steven Martin, Fort Collins, CO (US); Atul Goel, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1519 days.

(21) Appl. No.: 12/261,902

(22) Filed: Oct. 30, 2008

(65) Prior Publication Data

US 2010/0112965 A1 May 6, 2010

(51) Int. Cl.
*H04B 7/08* (2006.01)
*H04L 27/26* (2006.01)
*H04L 25/14* (2006.01)

(52) U.S. Cl.
CPC ............ *H04L 27/2601* (2013.01); *H04L 25/14* (2013.01)

(58) Field of Classification Search
CPC .................................... H04B 7/12; H04B 7/02
USPC .......................................................... 455/312
See application file for complete search history.

(56) References Cited

U.S. PATENT DOCUMENTS

| 5,163,029 | A | * | 11/1992 | Bryant et al. | 367/83 |
| 7,236,757 | B2 | * | 6/2007 | Raghavan et al. | 455/203 |
| 7,382,684 | B2 | * | 6/2008 | Love et al. | 367/41 |
| 7,391,819 | B1 | * | 6/2008 | von der Embse | 375/295 |
| 2006/0189280 | A1 | * | 8/2006 | Goldberg | 455/101 |

* cited by examiner

*Primary Examiner* — Lincoln Donovan
*Assistant Examiner* — Diana J Cheng (57) ABSTRACT

In a representative embodiment, an electronic transmitter comprises a signal source configured to provide an input signal comprising a plurality of frequency components; and a plurality of transducers each configured to receive the input signal and each configured to resonate substantially at one frequency of a subset of the plurality of frequency components. An electronic receiver, an acoustic transmitter and an acoustic receiver are also described.

11 Claims, 7 Drawing Sheets

METHOD AND APPARATUS TO TRANSMIT, RECEIVE AND PROCESS SIGNALS WITH NARROW BANDWITH DEVICES

BACKGROUND

In many applications, there is a need to provide a transmit function or a receive function that comprises a comparatively high bandwidth transmitter, or receiver, or both. One application where higher bandwidth devices may be useful is in the transmission and reception of fast transition time signals. For example, an ideal square wave has an infinite slope at the leading a trailing edges of each signal. As should be appreciated by one skilled in the art, in the frequency domain such a signal comprises an infinite number of frequency components that are multiple of the fundamental frequency (harmonics). Realizable square waves have a large number of high frequency components with distributions around the harmonics. More complex signals have a frequency content that is not necessarily associated with harmonics. The frequency content of these higher complexity signals can be described by various types of mathematical decompositions such as Fourier, Laplace, Wavelet and others known to one of ordinary skill in the art. To transmit or receive these fast varying signals, the transmitter or receiver has to respond to the high frequency content. Thus, known transmitters and receivers require a high bandwidth to handle such signals.

While comparatively high bandwidth devices allow transmission and reception of signals have a broad range of frequencies, there are drawbacks to known broadband devices. For example, known high bandwidth devices are often more complex and more expensive to manufacture; they are more susceptible to noise limitations and often have a comparatively low quality (Q) factor, or simply Q. Thus, the gain of high bandwidth comes at the expense of price and performance.

There is a need, therefore, for a transmitter, or a receiver, or both, capable that overcomes at least the shortcoming of known devices discussed above.

SUMMARY

In accordance with a representative embodiment, an electronic receiver, comprises: a plurality of transducers, each transducer being configured to resonate substantially at one frequency and to provide an output at the one frequency; and a signal processor configured to multiply each output by a respective coefficient and to add the outputs to reproduce the frequency content of a signal.

In accordance with another representative embodiment, an electronic transmitter comprises: a plurality of transducers each configured to receive an input signal comprising a plurality of frequency components and each configured to resonate substantially at one frequency of a subset of the plurality of frequency components.

In accordance with a representative embodiment, an acoustic receiver comprises: a plurality of acoustic transducers, each acoustic transducer being configured to resonate substantially at one frequency and to provide an output at the one frequency; and a signal processor configured to multiply each output by a respective coefficient and to add the outputs to reproduce the frequency content of a signal.

In accordance with another representative embodiment an acoustic transmitter, comprises: a plurality of acoustic transducers each configured to receive an input signal comprising a plurality of frequency components and each configured to resonate substantially at one frequency of a subset of the plurality of frequency components.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DEFINED TERMINOLOGY

As used herein, the terms 'a' or 'an', as used herein are defined as one or more than one.

In addition to their ordinary meanings, the terms 'substantial' or 'substantially' mean to with acceptable limits or degree to one having ordinary skill in the art. For example, 'substantially cancelled' means that one skilled in the art would consider the cancellation to be acceptable.

In addition to their ordinary meanings, the terms 'approximately' mean to within an acceptable limit or amount to one having ordinary skill in the art. For example, 'approximately the same' means that one of ordinary skill in the art would consider the items being compared to be the same.

In addition to its ordinary meaning, the term 'narrow bandwidth' means having a bandwidth that is smaller than a signal bandwidth. Thus, a narrow bandwidth device of representative embodiments has a bandwidth that is less than the bandwidth of a signal transmitted by or received by the narrow bandwidth.

In addition to its ordinary meaning, the term 'signal' comprises acoustic or electromagnetic waves ranging from substantially continuous waves to pulses of comparatively short duration.

DETAILED DESCRIPTION

In the following detailed description, for purposes of explanation and not limitation, representative embodiments disclosing specific details are set forth in order to provide a thorough understanding of the present teachings. Descriptions of known devices, materials and manufacturing methods may be omitted so as to avoid obscuring the description of the representative embodiments. Nonetheless, such devices, materials and methods that are within the purview of one of ordinary skill in the art may be used in accordance with the representative embodiments.

In the representative embodiments, in the interest of simplicity Fourier composition and decomposition is described. Notably, other mathematical decomposition techniques are contemplated, including but not limited to Laplace, Fourier-Laplace, Gaussian and Wavelet techniques.

Figure 1:
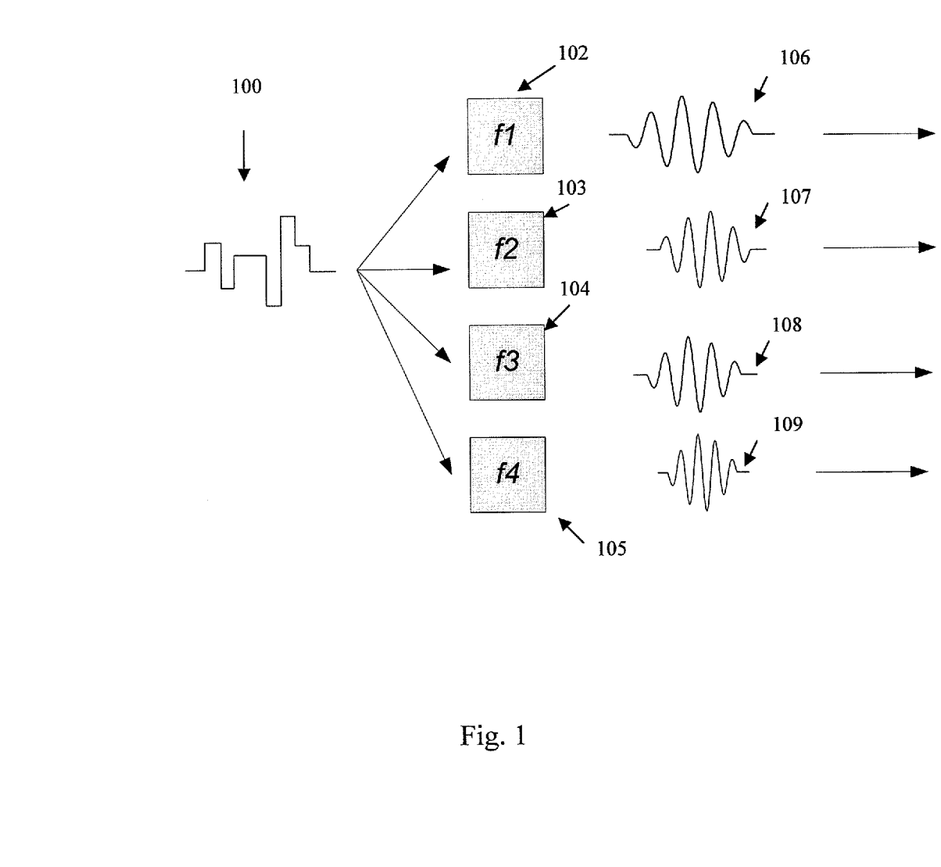
FIG. 1 shows a simplified schematic diagram of a transmitter in accordance with a representative embodiment.

FIG. 1 is a simplified schematic diagram of a transmitter 100 in accordance with a representative embodiment. The transmitter 100 comprises a plurality of comparatively narrowband transducers ("transducers") 102-105, which are adapted to receive an input signal 101. As described more fully herein, the input signal 101 undergoes Fourier decomposition with each transducer 102-105 being configured to emit a respective output signal, shown as output signals 106-109, respectively. As should become clearer as the present description continues, the number of transducers is determined by a certain considerations, such as the complexity of the input signal 101, and the number of Fourier components used to decompose the input signal 101.

The transducers 102-105 are each configured to resonate substantially at a selected resonant frequency and emit signals over a comparatively narrow bandwidth. In certain representative embodiments, the transducers may be acoustic transducers, such as the acoustic MEMS transducers. The transducers may be as described in commonly owned U.S. patent application Ser. No. 11/588,752 entitled PIEZOELECTRIC MICROPHONES, to R. Shane Fazzio, et al.; Ser. No. 11/604,478, to R. Shane Fazzio, et al. entitled TRANSDUCERS WITH ANNULAR CONTACTS and filed on Nov. 27, 2006; and Ser. No. 11/737,725 to R. Shane Fazzio, et al. entitled MULTI-LAYER TRANSDUCERS WITH ANNULAR CONTACTS and filed on Apr. 19, 2007, to Fazzio, et al. Alternatively, the transducers 102-105 may be a capacitive or piezoelectric micromachined ultrasonic transducer (cMUT or pMUT, respectively), which are transducers known to one of ordinary skill in the art.

In a representative embodiment, the bandwidth of each transducer 102-105 is approximately the same, in the range of approximately one-half (½) of the bandwidth of input signal 101 to approximately one-one hundredth (1/100) of the bandwidth of the input signal. In specific embodiments, the bandwidth of each transducer 102-105 is in the range of approximately 1/10 to 1/100 of the bandwidth of the input signal. As should be appreciated by one of ordinary skill in the art, the narrower the bandwidth of the transducer, the higher its Q-factor. Thus, the transducers 102-105 are generally high-Q devices, which provide great benefits in terms of efficiency and signal-to-noise ratios of the signals generated.

In operation, the input signal 101 is provided to each of the transducers 102-105. The input signal 101 may be a time-varying signal comprising a sinusoidal or other repetitive signal (carrier) modulated in amplitude, frequency or phase by a wave of lower frequency. Because the input signal 101 is a time-varying signal it can be represented by a Fourier series or an alternative frequency decomposition comprising a sum of periodic functions, each weighted by a respective Fourier coefficient. Additionally, in certain embodiments, further correction may be useful because passing the signal through a bank of narrowband transducer results in the decomposing of the signal into frequency components based on the shape of the frequency response of the transducer (e.g., a Gaussian distribution). Because the transducers 102-105 are not necessarily perfect or identical, trying to re-compose the input signal from the Fourier decomposition may require correction to compensate for these imperfections. This may be effected via signal conditioning methods known to one of ordinary skill in the art.

As noted, each transducer 102-105 is configured to resonate substantially at a particular frequency and emit a signal with the particular center frequency and a comparatively narrow bandwidth. In the representative embodiment, each transducer 102-105 is configured to resonate substantially at a selected one of the Fourier frequencies that compose the input signal 101. Because of their comparatively narrow bandwidths, the resonators 102-105 will not be substantially excited by neighboring Fourier components of the Fourier series spectrum representative of the input signal. Thus, transducer 102 having resonance frequency at f1 will be excited by a Fourier component at this frequency, but is substantially unaffected by frequency component neighboring component f3. Thus, each transducer 102-105 is configured to 'pick' off substantially one selected Fourier component and is unaffected by neighboring components.

As is known, the number of Fourier components in a Fourier series representing the input signal 101 is infinite, with each Fourier coefficient dictating the relative importance or weight of its respective component. As such, in the interest of practicality, rather than very large number of transducers with one for each Fourier component of the Fourier series, the representative embodiment comprises one transducer for each of a subset of the number of Fourier components. The selected subset is based on the relative weight of the Fourier components needed to re-compose the input signal, for example. Naturally, and as described more fully herein, the more components (and thus transducers), the more accurate the representation of the input signal when the components are used to compose the input signal through Fourier re-composition. Quantitatively, the Fourier series of the input signal 101 may be represented as $$F(t)=C1\sin(2\pi f1t+\phi1)+C1\sin(2\pi f2t+\phi2)+C3\sin(2\pi f3t+\phi3)+C4\sin(2\pi f4t+\phi4)$$

where F is the amplitude versus time, C1 ... CN are the Fourier coefficients and f1, f2, f3, f4 ... fN are the Fourier frequency components (or simply frequency components) that comprise the signal F and $\phi$N are phase terms.

As alluded to above, in a representative embodiment, each transducer 102-105 is configured to resonate substantially at a selected one of the frequency components. For example, transducer 102 resonates substantially at f1; transducer 103 resonates substantially at f3, and so forth. Because it is impractical to provide a transducer for a very large number of frequency components, the number and resonant frequency of the transducers are selected with knowledge of the dominant frequency components and the diminishing returns of the inclusion of transducers for less significant components. For example, in the present representative embodiment, the determination has been made that the magnitude of the coefficients C5, ..., CN is comparatively small and that the impact of the Fourier components above N=3 on the re-composed signal can be foregone.

Upon incidence of the input signal 101, each transducer will resonate substantially at its respective particular component frequency and will emit a signal having a narrow bandwidth about its resonance frequency. Furthermore, the transducers 102-105 will emit a signal of one form of energy that is generally not the same as the form of energy comprising the input signal. Illustratively, the transducers 102-105 are acoustic MEMS transducers, and the input signal is an electrical signal. The transducers 102-105 convert respective electromagnetic components into respective acoustic signals having an acoustic center frequency and acoustic bandwidth. For example, transducer 102 will resonate substantially at the frequency component f1 and will emit output signal 106 having a center frequency f1 and a bandwidth equal to approximately the bandwidth of the transducer 102. Similarly, transducer 103 will emit signal 107 having a center frequency equal to frequency component f2 with a bandwidth equal to approximately the bandwidth of the transducer 103. Continuing, transducer 104 emits a signal 108 having a center frequency equal to frequency component f3 with a bandwidth equal to approximately the bandwidth of the transducer 104; and transducer 105 emits a signal 109 having a center frequency equal to frequency component f4 with a bandwidth equal to approximately the bandwidth of the transducer 105.

The respective output signals 106-109 represent the decomposition of the input signal comprising selected Fourier components. Illustratively, if all the transducers have the same efficiency, their response will constitute a substantially valid spectral decomposition. However, if the transducers are not equal or there is an imbalance in the different paths during construction, the respective amplitude of each output signal 106-109 is not representative of the relative magnitude of each Fourier component. As will be described more fully in connection with a representative embodiment presently, the output signals 106-109 can be selectively transformed from one form of energy to another and recombined in a Fourier series to form an output signal representative of input signal 101.

Figure 2A:
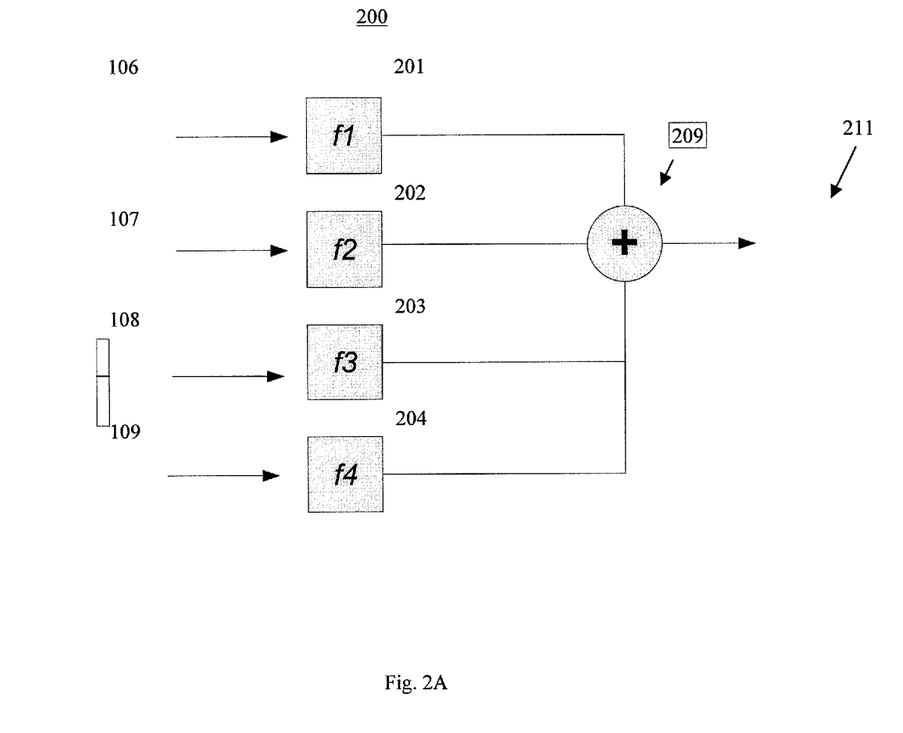
FIG. 2A shows a simplified schematic diagram of a receiver in accordance with a representative embodiment.

FIG. 2A is a simplified schematic diagram of a receiver 200 in accordance with a representative embodiment. Many of the details provided above in connection with the description of embodiments of FIG. 1 are common to the presently described embodiments. These common details are generally not repeated to avoid obscuring the details of the present embodiments.

Output signals 106-109 from transducers 102-105, for example, are incident on transducers 201-204, respectively. The transducers 201-205 are substantially identical to respective transducers 102-105, but (as applicable) effect an opposite conversion of energy than that of transducers 102-105. For example, in keeping with the previous example, output signals 106-109 have center frequencies that are illustratively in the acoustic spectrum, and thus transducers 201-204 convert these acoustic signals into respective signals with center frequencies in the electromagnetic spectrum. As such, transducer 201 resonates substantially at frequency f1 and converts the acoustic signal having center frequency f1 into an electromagnetic signal having a center frequency f1 and a comparatively narrow frequency bandwidth thereabout. Similarly, transducer 202 resonates substantially at frequency f2 and converts the acoustic signal having center frequency f2 into an electromagnetic signal having a center frequency f2 and a comparatively narrow frequency bandwidth thereabout; transducer 203 resonates substantially at frequency f3 and converts the acoustic signal having center frequency f3 into an electromagnetic signal having a center frequency f3 and a comparatively narrow frequency bandwidth thereabout; and transducer 204 resonates substantially at frequency f4 and converts the acoustic signal having center frequency f4 into an electromagnetic signal having a center frequency f4 and a comparatively narrow frequency bandwidth thereabout. In addition, due to the comparatively narrow bandwidths of the respective transducers 201-204, each transducer 201-204 is excited only by its respective output signal 106-109, and not by other signals of the input signal 101 decomposed into Fourier component signals.

After conversion from the energy form (e.g., acoustic) of the respective output signals 106-109 into the energy form output by respective transducers 201-204 (e.g., electromagnetic), each transducer 201-204 provides an output signal 205-208 respectively. These signals are provided to an signal processor 209, which first multiplies each signal by its respective Fourier coefficient and then adds the signals to provide an output signal 210 through Fourier re-composition. As described more fully herein, the signal processor 209 may comprise a logical control untill and be instantiated in an application specific integrated circuit (ASIC) or a field programmable gate array (FPGA) configured to multiply and add according to the Fourier series used to recompose the output signal from output signals 205-208.

Figure 2B:
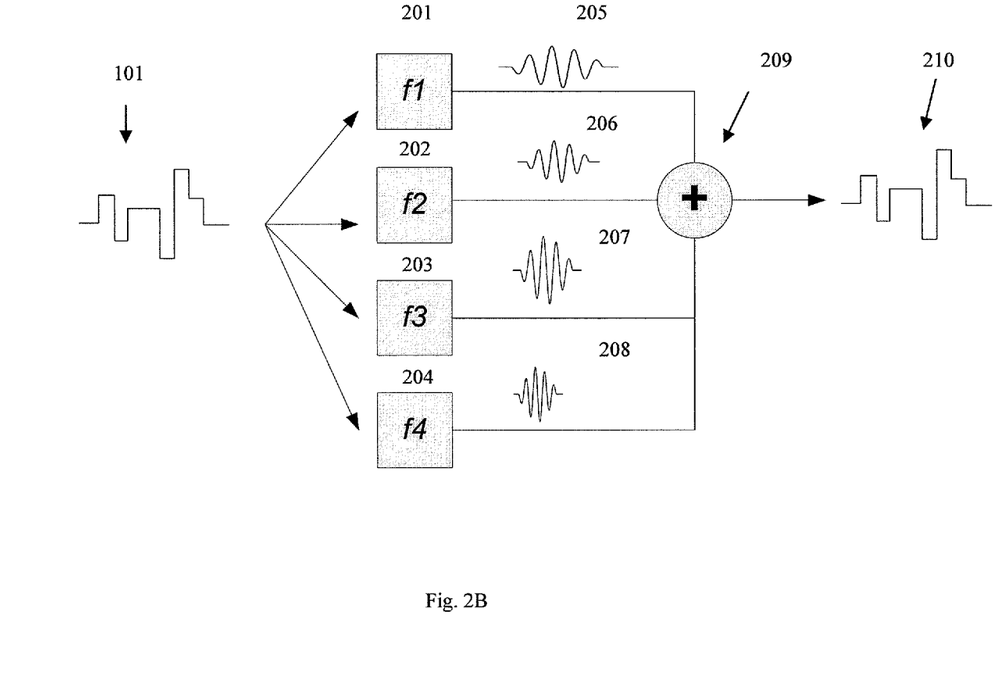
FIG. 2B shows a simplified schematic diagram of a receiver in accordance with a representative embodiment.

FIG. 2B is a simplified schematic diagram of a receiver 200 in accordance with a representative embodiment. Many of the details provided above in connection with the description of embodiments of FIGS. 1-2A are common to the presently described embodiments. These common details are generally not repeated to avoid obscuring the details of the present embodiments.

The representative embodiment of FIG. 2B show the versatility in the receiver 200 through its ability to receive input signal 101 directly and decompose the signal into Fourier components for re-composition through a Fourier series. In particular, the input signal 101 comprises Fourier frequency components, with each one of a subset of Fourier components being selected by respective transducer 201-204 as described previously. In a representative embodiment, input signal 101 may be an acoustic signal comprising a sinusoidal carrier wave modulated by an arbitrary time-dependent wave. In this representative embodiment, transducers 201-204 are excited only by Fourier components f1, f2, f3 and f4. Thus, input signal 101 is decomposed into four Fourier components at respective transducers 201-204, and respective output signals 205-209 are provided. These output signals, which are electromagnetic signals, are provided to signal processor 209, and combined to provide output signal 210. Thus, in the illustrative embodiment, input signal 101 in the acoustic spectrum is transformed into output signal 210 in the electromagnetic spectrum. This is merely illustrative, and the transformation of input signal 101 in the electromagnetic spectrum to output signal 210 in the acoustic spectrum is contemplated. The recomposition of input signal 101 in electromagnetic form to output signal 210 in acoustic form follows in substantially the same manner described, excepting of course that the transducers 201-204 are excited by Fourier components in the acoustic spectrum and convert these into output signals 205-209 in the electromagnetic spectrum.

Figure 3:
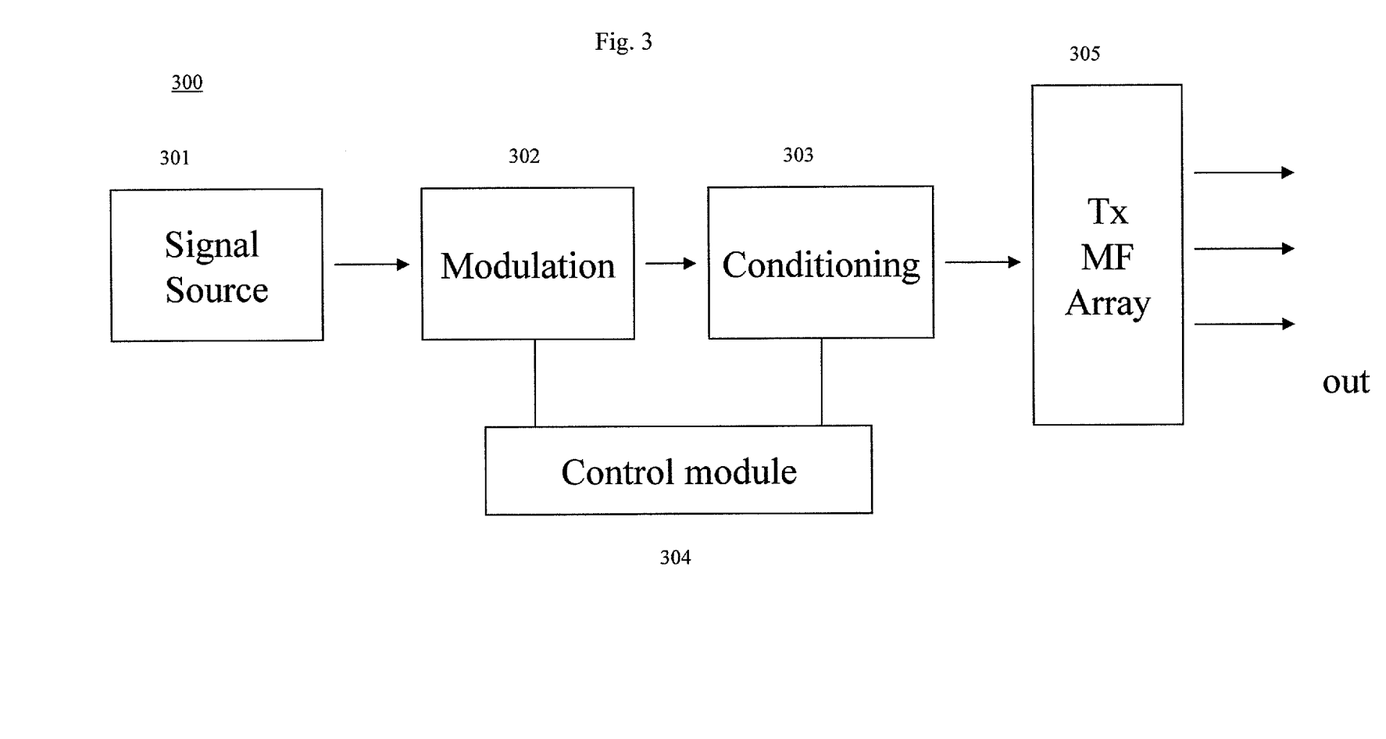
FIG. 3 shows simplified block diagram of a transmitter accordance with a representative embodiment.

FIG. 3 is a simplified block diagram of a transmitter 300 in accordance with a representative embodiment. Many of the details provided above in connection with the description of embodiments of FIGS. 1-2B are common to the presently described embodiments. These common details are generally not repeated to avoid obscuring the details of the present embodiments.

The transmitter 300 comprises a signal source 301 configured to provide a signal for transmission. The signal source may be one of a variety of signal sources useful in a selected field. Because the type of signal is application specific, one of a variety of signal sources is contemplated and should be apparent to one of ordinary skill in the art. For instance, the signal source 301 may provide a sinusoidal carrier described in connection with input signal 101, or may provide signals at desired frequencies. The output of the signal source 301 is optionally provided to a modulator 302. In a representative embodiment, the modulator 302 may be one of a variety of types of modulators for different modulation schemes. In keeping with the illustrative embodiments described previously, the modulator 302 may impose a time varying square-wave modulation on a sinusoidal carrier from the signal source 301. The output of the modulator 302 is provided to a signal conditioner 303, which is configured to modifies the shape of the signal to compensate for frequency dependent losses during transmission. Such signal conditioning may be effected by one of a variety of known methods and using various known devices.

As alluded to previously, the modulation scheme is beneficially selectable. To that end, a control module 304 is provided to effect the desired modulation scheme of the modulator 302 and the requisite signal conditioning of the signal conditioner 303. The signal conditioning may compensate for variations in amplitude or phase among the devices in a transmit multi-frequency array 305. The control module 304 may be a microprocessor or other known programmable device, such as an FPGA. This programmable capability will simplify replacement of arrays 305 with different characteristics. Finally, the output of the signal conditioner 303 is provided to the transmit multi-frequency array 305. The transmit multi-frequency array 305 may comprises an array of narrowband and high-Q transducers such as described in connection with the embodiments of FIGS. 1-2B.

Figure 4:
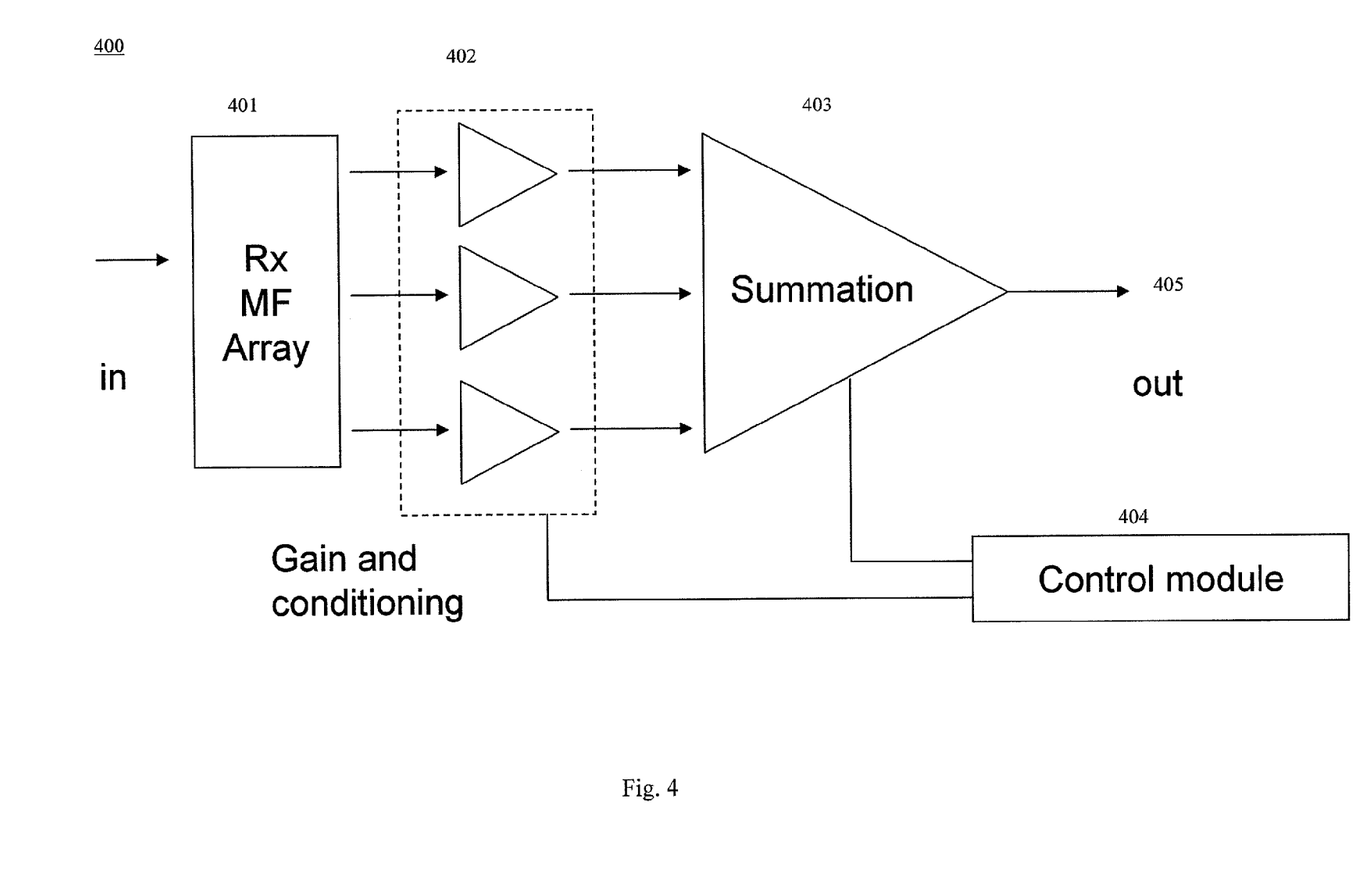
FIG. 4 is a simplified block diagram of a receiver in accordance with a representative embodiment.

FIG. 4 is a simplified block diagram of a receiver 400 in accordance with a representative embodiment. Many of the details provided above in connection with the description of embodiments of FIGS. 1-3 are common to the presently described embodiments. These common details are generally not repeated to avoid obscuring the details of the present embodiments.

The receiver 400 comprises a receiver multifrequency array 401. The receiver multifrequency array 401 may comprises an array of narrowband and high-Q transducers such as described in connection with the embodiments of FIGS. 1-2B, for example. The output of the receiver multifrequency array 401 is provided to a gain and conditioning stage 402. The gain and conditioning stage 402 provides signal conditioning and amplification by known methods and apparatuses. Beneficially, the gain and conditioning stage 402 modifies the shape of the signal to compensate for frequency dependent losses and phase changes and provides pre-amplification. The gain and conditioning stage 402 provides an input to control module 404. The output from the control module 404 comprises signals having a center frequency of a selected Fourier component and a bandwidth. The signals may be substantially identical to output signals 205-208 described previously. The control module 404 multiplies each frequency component by its respective Fourier coefficient and adds the frequency components and provides an output signal 405 In keeping with the representative Fourier series described previously, the control module 404 is configured provide the series:

$$F(t)=C1\sin(2\pi f1 t+\phi 1)+C1\sin(2\pi f2 t+\phi 2)+C3\sin(2\pi f3 t+\phi 3)+C4\sin(2\pi f4 t+\phi 4).$$

An output 405 is provided and comprises the recomposed signal from the Fourier series.

The receiver 400 also comprises a control module 404, which is programmable to produce both signal conditioning and setting correction coefficients in conditioning stage 402 and control summation at the signal processor 403. Illustratively, the control module may be a microprocessor or other known programmable device, such as an FPGA, or may be an ASIC. As should be appreciated, correction coefficients are useful because passing the signal through a bank of narrowband transducer results in the decomposing of the signal into frequency components based on the shape of the frequency response of the transducer (e.g., a Gaussian distribution). Because the transducers are not necessarily perfect or equal, trying to re-compose the input signal from this decomposition may require correction to compensate for these imperfections.

Example

In representative embodiments described above, the transducers 102-105 are configured to receive an electromagnetic input signal and transmit a plurality of acoustic signals; and the transducers 201-204 are configured to convert input acoustic signals into electromagnetic signals. In this example, the transducers are acoustic MEMS transducers. By way of illustration, the bandwidth of the input signal 101 may be approximately 20 kHz and the bandwidth of each respective transducer 102-205 and 201-204 is in the range of approximately 5 kHz to approximately 7 KHz. Thus, ratio of the signal bandwidth (SBW) to the transducer bandwidth (TBW) (DBW/SBW) is illustratively in the range of approximately ¼ to approximately ⅓. As should be appreciated, as TBW narrows, the number of devices needed increases (also depending on the signal). For Acoustic MEMS transducer arrays comprising two to six Acoustic MEMS transducers, the TBW is illustratively in the range of SBW/3 to SBW/20.

Figure 5:
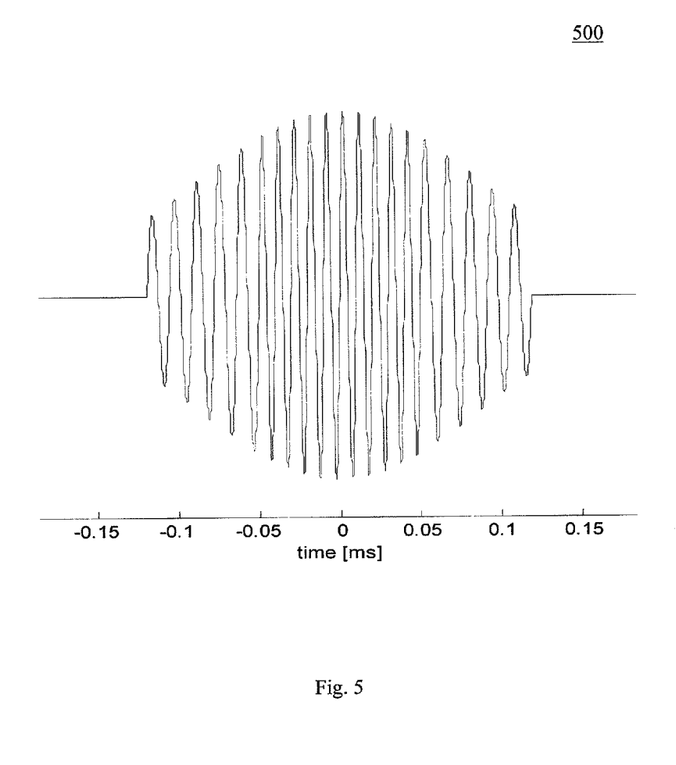
FIG. 5 is a representation of a signal (amplitude vs. frequency) that may be decomposed and recomposed in accordance with the representative embodiments.
Figure 6:
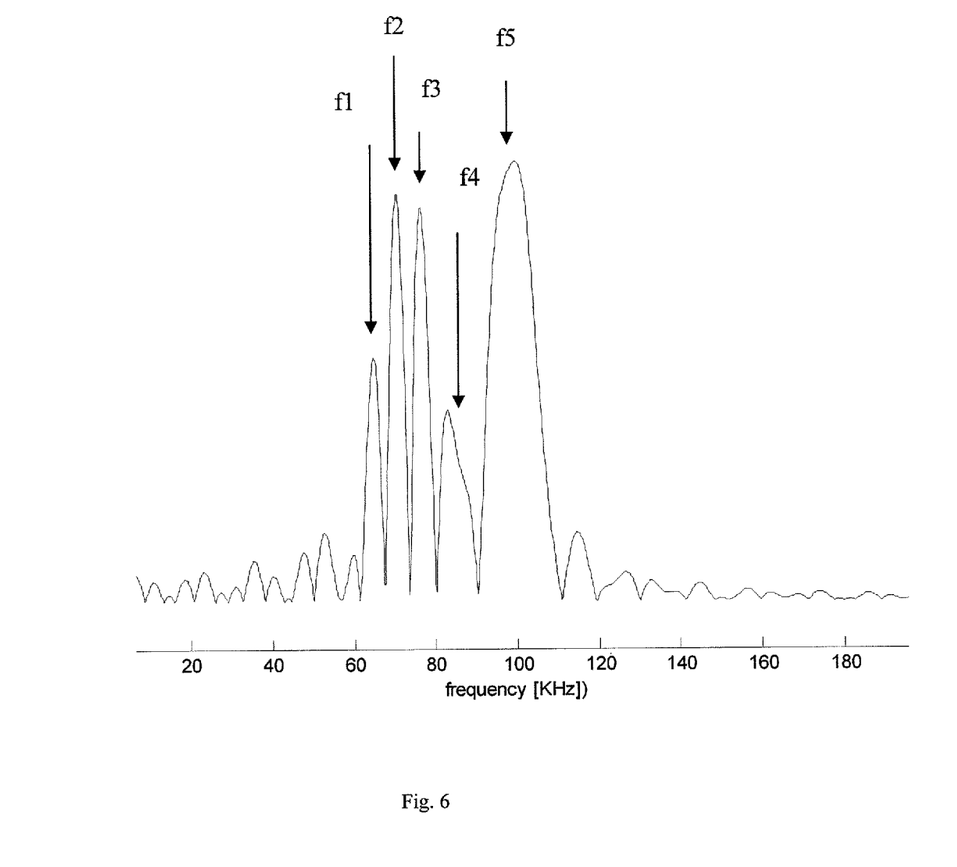
FIG. 6 is a representation of a decomposition of the signal (amplitude vs. frequency) of FIG. 5.

FIG. 5 is a representation of another signal (amplitude vs. time) that may be decomposed and recomposed in accordance with the representative embodiments above. As should be appreciated, the duration of the signal of FIG. 6 is comparatively short, and its decomposition/recomposition requires a greater number of frequency components, and thus a greater number of transducers than would be required of a signal of greater duration, for example FIG. 6 is a representation of a decomposition of signal (amplitude vs. frequency) 500 that in accordance with the representative embodiments above. As shown, there are a plurality of frequency components (f1, f2, f3, f4, f5) that can be used in the composition and decomposition according to the representative embodiments.

In view of this disclosure it is noted that the apparatuses and methods to transmit, receive and process signals described herein can be implemented via a variety of devices, variant structures, configurations and topologies. Moreover, applications other than transmission, reception and processing of signals may benefit from the present teachings. Further, the various devices, structures and parameters are included by way of example only and not in any limiting sense. In view of this disclosure, those skilled in the art can implement the present teachings in determining their own applications and needed materials and equipment to implement these applications, while remaining within the scope of the appended claims.

The invention claimed is:

1. An electronic receiver, comprising:
   a plurality of acoustic transducers, each acoustic transducers being configured to resonate substantially at one frequency and to provide an output at the one frequency, wherein the frequency of each of the plurality of acoustic transducers differs from the frequency of all other acoustic transducers of the plurality of acoustic transducers; and
   a signal processor configured to multiply each output by a respective coefficient and to add the outputs to reproduce the frequency content of a signal.

2. An electronic receiver as claimed in claim 1, wherein each resonant frequency is a Fourier component of the input signal, and the respective coefficients each comprise a Fourier coefficient.

3. An electronic receiver as claimed in claim 1, wherein the signal processor provides a signal comprising a bandwidth, and each of the acoustic transducers comprises a bandwidth in the range of approximately one-half of a signal bandwidth and approximately one-one hundredth of the signal bandwidth.

4. An electronic receiver as claimed in claim 1, wherein each resonant frequency is a harmonic of a fundamental frequency.

5. An electronic receiver as claimed in claim 1, wherein at least one resonant frequency is not a multiple of another resonant frequency.

6. An electronic transmitter as claimed in claim 1, wherein the input signal comprises a bandwidth, and each of the acoustic transducers comprises a bandwidth in the range of approximately one-half of the signal bandwidth and approximately one-one hundredth of the signal bandwidth.

7. An acoustic receiver, comprising:
   a plurality of acoustic transducers, each of the plurality of acoustic transducers being configured to resonate substantially at one frequency and to provide an output at the one frequency, wherein the frequency of each of the plurality of acoustic transducers differs from the frequency of all other acoustic transducers of the plurality of acoustic transducers; and
   a signal processor configured to multiply each output by a respective coefficient and to add those outputs to reproduce a frequency content of an input signal.

8. An acoustic receiver as claimed in claim 7, wherein each resonant frequency is a Fourier component of the input signal, and the respective coefficients each comprise a Fourier coefficient.

9. An acoustic receiver as claimed in claim 7, wherein the signal processor provides a signal comprising a bandwidth, and each of the acoustic transducers comprises a bandwidth in the range of approximately one-half of the signal bandwidth and approximately one-one hundredth of the signal bandwidth.

10. An acoustic receiver as claimed in claim 7, wherein each resonant frequency is a harmonic of a fundamental frequency.

11. An acoustic receiver as claimed in claim 7, wherein at least one resonant frequency is not a multiple of another resonant frequency.

* * * * *